United States Patent [19]

Cooper et al.

[11] 4,044,243

[45] Aug. 23, 1977

[54] INFORMATION PROCESSING SYSTEM

[75] Inventors: Leon N. Cooper; Charles Elbaum, both of Providence, R.I.

[73] Assignee: Nestor Associates, Stonington, Conn.

[21] Appl. No.: 707,995

[22] Filed: July 23, 1976

[51] Int. Cl.² .......................... G05B 13/02; G06F 7/38
[52] U.S. Cl. ...................................... 235/152; 364/900
[58] Field of Search ............................. 235/152, 150.1; 340/172.5, 146.3 T; 307/201; 445/1

[56] References Cited

U.S. PATENT DOCUMENTS

| | | | |
|---|---|---|---|
| 3,408,627 | 10/1968 | Kettler et al. | 340/172.5 |
| 3,435,422 | 3/1969 | Gerhardt et al. | 340/172.5 |
| 3,950,733 | 4/1976 | Cooper et al. | 340/172.5 |

OTHER PUBLICATIONS

L. N. Cooper, "A Possible Organization of Animal Memory & Learning", Collective Properties of Physical Systems, Nobel 24 (1973) pp. 252-264.

*Primary Examiner*—David H. Malzahn
*Attorney, Agent, or Firm*—Brumbaugh, Graves, Donohue & Raymond

[57] ABSTRACT

A digital adaptive information processing system which executes the algorithm described in our U.S. Pat. No. 3,950,733 issued April 13, 1976. The system includes a digital input register adapted to receive and store N numbers $s_1, s_2, \ldots s_N$ representing an input signal; a digital output register adapted to receive and store $n$ numbers $r_1, r_2, \ldots r_n$ representing an output response; and digital information processing apparatus, connecting the input register with the output register, and operative to carry out the processing steps required to "map" the numbers stored in the input register into numbers placed in storage in the output register in accordance with the aforementioned algorithm.

18 Claims, 6 Drawing Figures

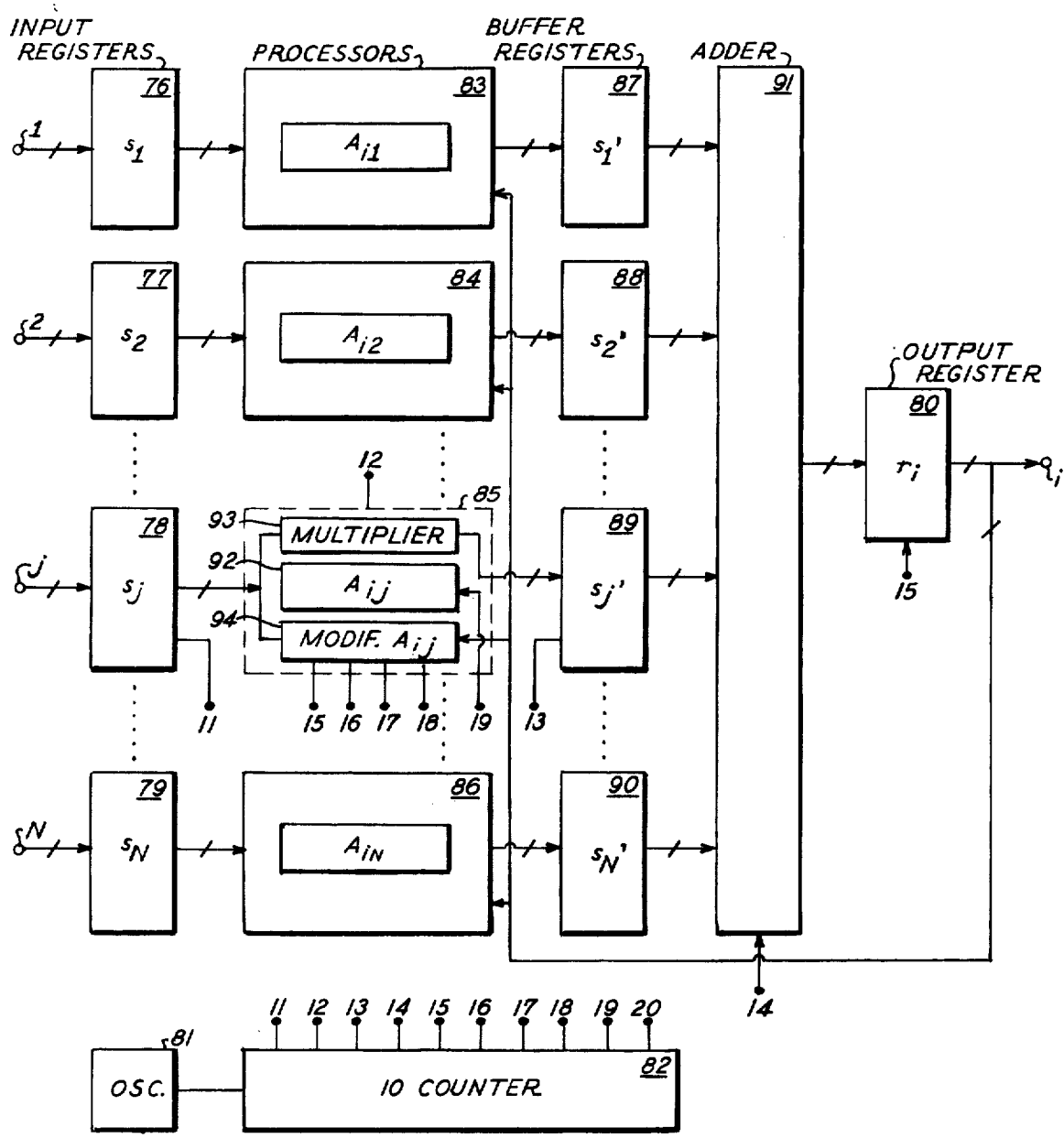

INFORMATION PROCESSING SYSTEM

BACKGROUND OF THE INVENTION

The present invention relates to an adaptive information processing system; that is, the invention concerns a self-organizing apparatus or process for "mapping" an input signal into an output response, which output response may vary over time, notwithstanding the presence of the same input signal, as the system "learns" or is "trained".

Our U.S. Pat. No. 3,950,733 issued Apr. 13, 1976 discloses an information processing system of the above-mentioned type. This system includes a module, called the Nestor™ adaptive module, which operates to map an input signal into an output response in accordance with a particular algorithm. When operated in a so-called "learning mode", the Nestor adaptive module modifies itself to both "learn" and "forget" at desired rates. When operated in a so-called "memory mode", the module neither learns nor forgets but functions as a pure distributed memory.

Our U.S. Pat. No. 3,950,733 discloses an analog circuit as a specific representative embodiment of the Nestor adaptive module. While an analog circuit of this type constitutes a simple and straightforward practical realization of the Nestor adaptive module, it may not be readily brought into production using currently known techniques for the manufacture of large-scale integrated circuits (LSI's). These techniques of circuit design and manufacture, which permit reductions in circuit size and power consumption, have been developed for digital logic storage functions and may not be readily adaptable to the production of analog circuits.

SUMMARY OF THE INVENTION

It is a primary object of the present invention to provide an adaptive information processing system using digital logic and storage devices which operate to map an input signal into an output response in accordance with the algorithm disclosed in our U.S. Pat. No. 3,950,733.

This object as well as other objects which will become apparent in the discussion as follows, are achieved, in accordance with the present invention, by providing a digital, adaptive information processing system having an input register for storing N digital numbers $s_1, s_2, \ldots, s_j, \ldots, s_N$ representing the input signal; an output register for storing n digital numbers $r_1, r_2, \ldots, r_i, \ldots, r_n$ representing the output response and digital information processing apparatus, connecting the input register with the output register, for carrying out the processing steps required to "map" the numbers stored in the input register into numbers placed in storage in the output register in accordance with the specified algorithm.

More particularly, the digital information processing apparatus of the present invention includes a digital memory for storing $n \times N$ digital weighting numbers $A_{11}, A_{12} \ldots A_{ij} \ldots, A_{nN}$; a digital multiplier, coupled to the input register and to the digital memory, for multiplying selected ones $s_j$ of the numbers located in the input register with selected ones $A_{ij}$ of the weighting numbers to produce digital product numbers $s'_j$ in accordance with the formula $s'_j = A_{ij}s_j$; a digital adder, coupled to the multipler and to the output register, for adding together selected ones of the product numbers $s'_j$ to produce digital sum numbers $r_i$ in accordance with the formula $$r_i = \sum_{j=1}^{N} s'_j$$

and for storing these sum numbers in the output register; and a digital modifier coupled to the input and output registers and to the memory, for changing the weighting numbers $A_{ij}$ in accordance with the formula $A_{ij}(t) = \gamma A_{ij}(t-1) + \eta s_j r_i$, where $A_{ij}(t)$ is the new number stored in the memory, $A_{ij}(t-1)$ is the number previously stored in the memory, $\gamma$ is a decay constant in the range $o \leq \gamma \leq 1$, $\eta$ is a learning constant for which $o \leq \eta$, $s_j$ is the number stored in the output register, and $i$ and $j$ are integers from 1 to n and N, respectively.

As described in our U.S. Pat. No. 3,950,733 and in accordance with the present invention, the modification of the weighting numbers $A_{ij}$ may be varied, for example by varying the decay constant $\gamma$ and/or the learning constant $\eta$. In particular, the modifications to $A_{ij}$ may be reduced to zero so that the information processing system operates as a pure distributed memory which neither learns nor forgets. Since, in this case, each individual output number $r_i$ produced by the system is a function of a plurality of weighting numbers $A_{ij}$ as well as a plurality of input numbers $s_j$, the system memory is not vulnerable to partial damage as is the case with conventional storage devices.

While the present invention is described in terms of apparatus, it will be understood that the invention also concerns and resides in the process of digital calculation executed by such apparatus.

The apparatus and process in accordance with the present invention readily lends itself to realization by well known techniques of producing large-scale integrated circuits. It is therefore possible to construct a Nestor adaptive module on one or more semiconductor "chips" which may be placed, for example, on a circuit board and connected together or connected to the outside world in the manner described in our U.S. Pat. No. 8,950,733. Since information originating from the outside world is normally in analog form, such information must first be digitized using conventional analog-to-digital conversion techniques before it is supplied to the input register of the information processing system as the digital input numbers $s_1, s_2, \ldots, s_N$.

BRIEF DESCRIPTION OF THE DRAWINGS

FIG. 5 is a block diagram of a digital nouveron network in accordance with a second preferred embodiment of the present invention.

DESCRIPTION OF THE PREFERRED EMBODIMENT

Two preferred embodiments of the present invention will now be described in detail with reference to FIG. 1-6 of the drawings.

Figure 1:
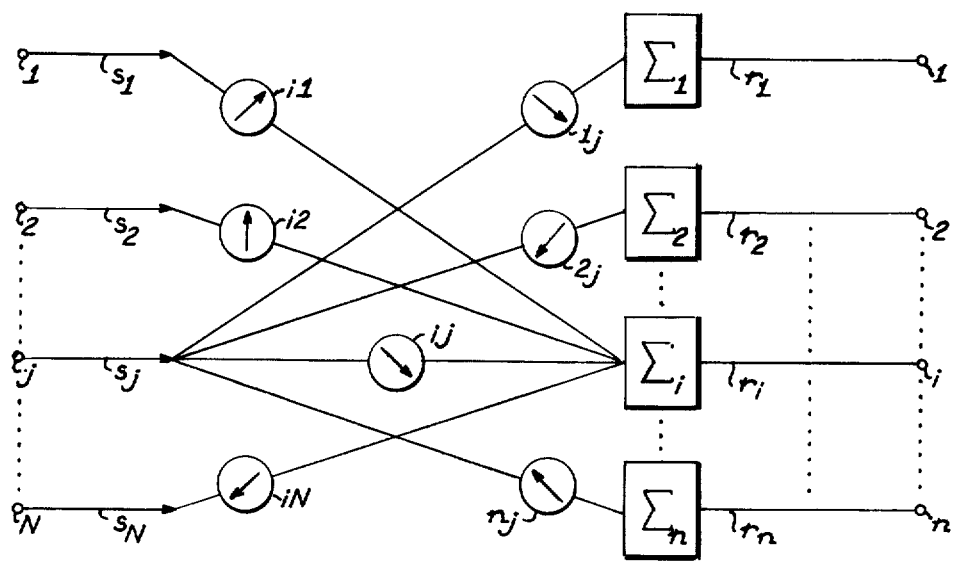
FIG. 1 is a functional block diagram of a Nestor™ adaptive module.

FIG. 1 illustrates a Nestor$^{TM}$ adaptive module as is shown and described in our U.S. Pat. No. 3,950,733 issued Apr. 13, 1976. This module is comprised of n nouverons which present n output responses $r_1, r_2, \ldots r_i, \ldots r_n$ at n output terminals $1, 2, \ldots i, \ldots n$, respectively. Each (e.g., the $i^{th}$) nouveron of the module accepts N input signals $s_1, s_2, \ldots s_j, \ldots s_N$ from N input terminals $1, 2, \ldots j, \ldots N$, respectively. These input signals are supplied to N mnemonders $i1, i2, \ldots ij, \ldots iN$, as shown, which are all connected to a summer $\Sigma_i$ that produces a nouveron output response $r_i$. Each (e.g., the $ij^{th}$) mnemonder has a transfer function $A_{ij}$; that is, the output of the mnemoder is $$s'_j = A_{ij} s_j \qquad (1)$$

where $s_j$ is the input signal supplied to that mnemodner. The output response $r_i$ produced by the summer $\Sigma_i$ is therefore:

$$r_i = \sum_{j=1}^{N} s'_j \qquad (2)$$

Figure 4:
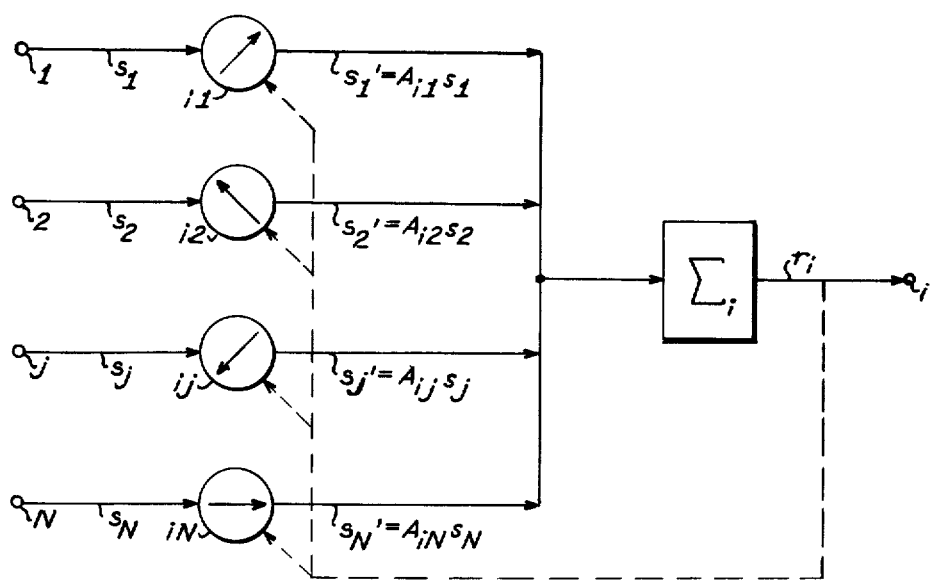
FIG. 4 is a functional block diagram of a nouveron network which is employed in the Nestor™ adaptive module.

The structure of a single nouveron is illustrated in FIG. 4. As is represented there by the dashed line, the output response $r_i$ is fed back to each mnemonder to modify its respective transfer function $A_{ij}$. In one preferred algorithm, the modifications to each transfer function are of the following form:

$$A_{ij}(t) = \gamma A_{ij}(t-1) + \eta s_j r_i \qquad (3)$$

where $A_{ij}(t)$ is the new (modified) transfer function, $A_{ij}(t-1)$ is the previous transfer function, $\gamma$ is a decay constant in the range $o \leq \gamma \leq 1$, and $\eta$ is a learning constant for which $o \leq \eta$.

In accordance with the present invention, each input signal $s_j$ and output response $r_i$ is represented by a digital number (e.g., an eight-bit binary number), which may be stored or held as long as desired in an appropriate register. Each transfer function $A_{ij}$ is, in this case, a simple multiplier; i.e., it is also a digital (eight-bit binary) number that is to be multiplied with the number representing the proper input signal $s_j$ to produce still another digital (e.g., eight-bit binary) number representing the output $s'_j$ of the mnemonder. (In the event that a particular product has more than eight digits, the most significant eight bits are chosen.) Thus, we may view the matrix of transfer functions $A_{ij}$ as constituting an array of N × n digital numbers stored in an active memory of suitable sized. In view of this simplifying assumption wherein each transfer function $A_{ij}$ is really a digital multiplier and not a complicated function, these transfer functions are herein denoted as modifiable "weighting numbers".

Figure 2:
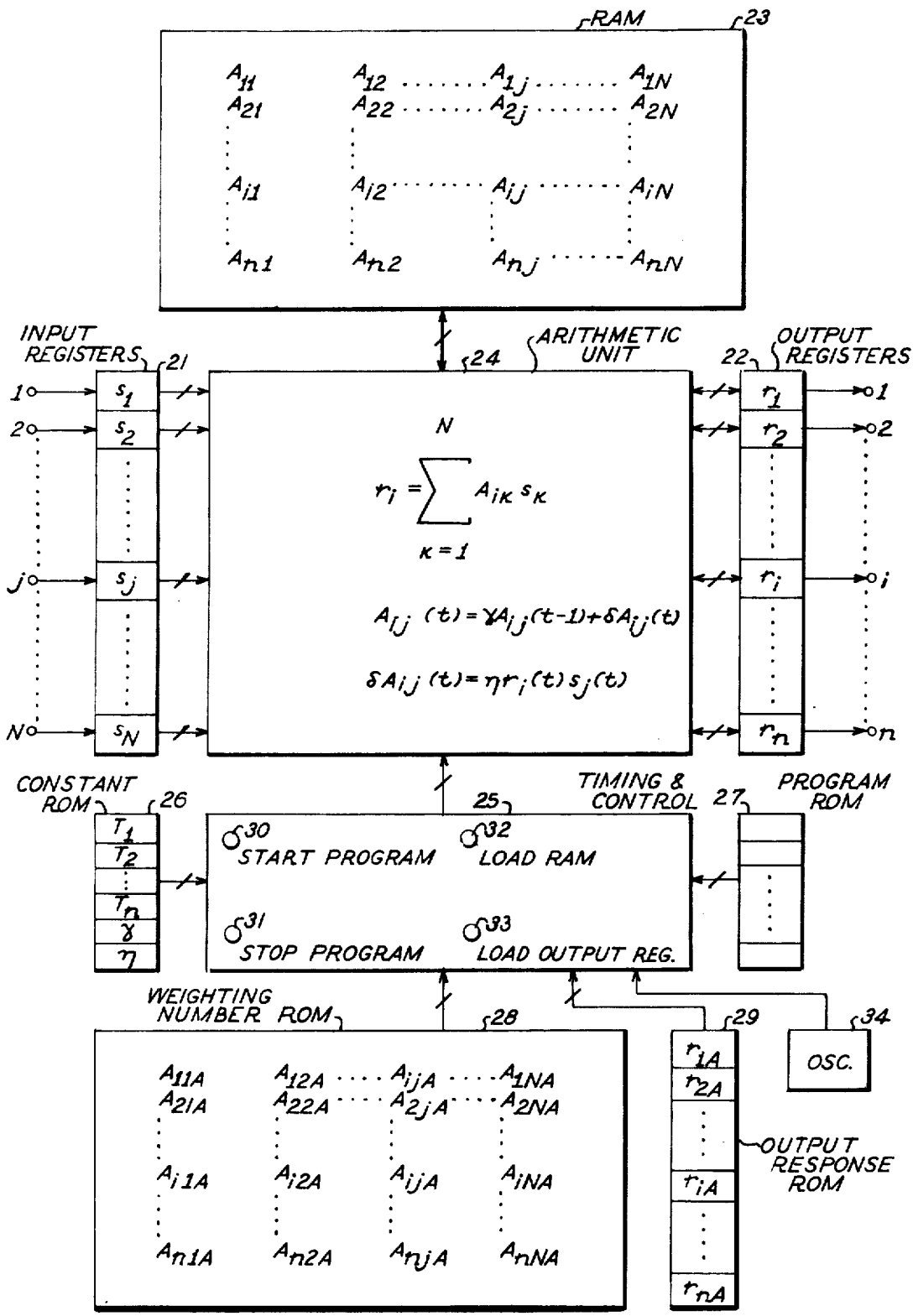
FIG. 2 is a block diagram of a digital, adaptive information processing system in accordance with a first preferred embodiment of the present invention.

FIG. 2 shows the "architecture" of a digital, adaptive information processing system in accordance with a first preferred embodiment of the present invention. This arrangement comprises a set of digital input registers 21, adapted to receive and store N numbers $s_1, s_2, \ldots, s_j \ldots s_N$ representing the input signal; a set of digital output registers 22, adapted to receive and store n numbers $r_1, r_2, \ldots, r_i r_n$ representing the output response; and centrally organized, digital information processing apparatus connecting the input registers 21 with the output registers 22. The information processing system according to the present invention repeatedly carries out the processing steps required to "map" the numbers stored in the input registers into numbers placed in storage in the output registers in accordance with the algorithm defined by equations (1) - (3) and described in full detail in our U.S. Pat. No. 3,950,733 issued Apr. 13, 1976. In the present embodiment, this system is conceived as a large-scale integrated circuit — that is, a micro-miniaturized semiconductor chip or plurality of chips—in which the storage, arithmetic and control functions are physically (spacially) segregated to make efficient use of chip real estate and to facilitate utilization of conventional off the shelf circuit components.

Basically, the first embodiment of the invention consists of a centrally organized microprocessor which is structured by software or firmware to carry out the calculations necessary to function in accordance with the abovenoted algorithm. This embodiment is to be contrasted with the second embodiment of the present invention, illustrated in FIGS. 5 and 6 and described hereinbelow, in which the various memory, arithmetic and control elements are spacially distributed throughout the functions they perform are "hard wired" into the device.

The centrally organized, adaptive information processing system in accordance with the first embodiment of the present invention may comprise a commercially available microprocessor, such as is generally described for example in Hasson's text *Micro-programming: Principles and Practices* (Prentice-Hall), or it may be constructed of commercially available large-scale integrated (LSI) logic units connected together in a manner such as is illustrated in FIG. 2 using circuit design techniques which are now well known in the art.

The information processing system shown in FIG. 2 comprises a high speed random access memory (RAM) 23 of suitable size to store N × n weighting numbers $A_{ij}$. For example, if the weighting numbers are eight-bit binary, and if the module is designed to receive one hundred input signals (N=100) and produce one hundred output responses (n=100) then the RAM 23 should be capable of storing 10,000 eight-bit words or "bytes" (if a memory "word" contains more than eight bits). Each word should, of course, include a sign bit because the digital numbers stored and processed may assume negative as well as positive values.

The RAM 23 is connected to receive words from, and to supply words to an arithmetic unit 24. Preferably, the contents of each word are either written into or read out from memory in parallel form. The arithmetic unit 24 is capable of carrying out conventional, mathematical binary logic functions such as addition, multiplication and comparison, under the control of a timing and control unit 25. The arithmetic unit 24 receives the numbers (e.g., eight-bit words) upon which it operates from the input and output registers 21 and 22, from the RAM 23 and from the timing and control unit 25. The arithmetic unit places the results of its computations in the output registers 22 and the RAM 23.

The timing and control unit 25 receives input from four read-only memories:

1. an ROM 26 for storing constants utilized in the execution of the algorithm;

2. an ROM 27 for storing the program required to execute the algorithm;

3. an ROM 28 for storing initial values of the weighting numbers $A_{ij}$; and 4. an ROM 29 for storing fixed values of the output responses $r_i$.

The initial values of the weighting numbers $A_{ij}$ are designated $A_{11A}, A_{12A}, \ldots A_{ijA}, \ldots A_{nNA}$. The fixed values of the numbers representing the output response are designated as $r_{1A}, R_{2A} \ldots r_{iA} \ldots r_{nA}$. Read-only memories are used to supply this information because they are inexpensive and because they may be conveniently furnished to users with the stored numbers permanently "burned in".

The timing and control unit 25 is provided with four buttons or "switches" which may be manually set by the operator of the module or automatically controlled by another information processing system:

1. a switch 30 which, when set, causes the unit to execute the program;

2. a switch 31 which, when set, causes the unit to halt the execution of the program after determining the number representing the last output response $r_n$;

3. a switch 32 which, when set, causes the contents of the weighting number ROM 28 to be transferred to the RAM 23; and 4. a switch 33 which, when set, causes the contents of the output response ROM 29 to be loaded into the output registers 22.

The timing and control unit 25 is clocked by an oscillator 34. In response to clock pulses, it receives successive instructions from the program ROM 27, decodes these and applies control signals to the arithmetic unit causing the arithmetic unit to receive and operate on numbers in the manner prescribed.

If an instruction from the program ROM 27 requires that a number located in one of the other ROMs 26, 28 and 29 be transmitted to the arithmetic unit 24, the timing and control unit 25, upon decoding this instruction, applies suitable reading signals to the appropriate ROM to read out the desired number and then passes this number to the arithmetic unit for use during execution of a subsequent instruction.

For example, if it is desired to transfer a weighting number $A_{ij}$ in the ROM 28 to a corresponding address in the RAM 23, the following two instructions may be stored in the program ROM 27:

READ X,
STORE Y;

where X and Y are the addresses of $A_{ijA}$ and $A_{ij}$ in the ROM 28 and RAM 23, respectively. When the timing and control unit 25 decodes the READ X instruction, it applies suitable signals to the ROM 28 to read out $A_{ijA}$ and passes this number, in parallel form, to a register or accumulator in the arithmetic unit 24. Thereafter, when the timing and control unit decodes the instruction STORE Y, it applies suitable signals to the arithmetic unit to pass the contents of the register containing $A_{ijA}$ to the proper address for $A_{ij}$ in the RAM 23.

Figure 3:
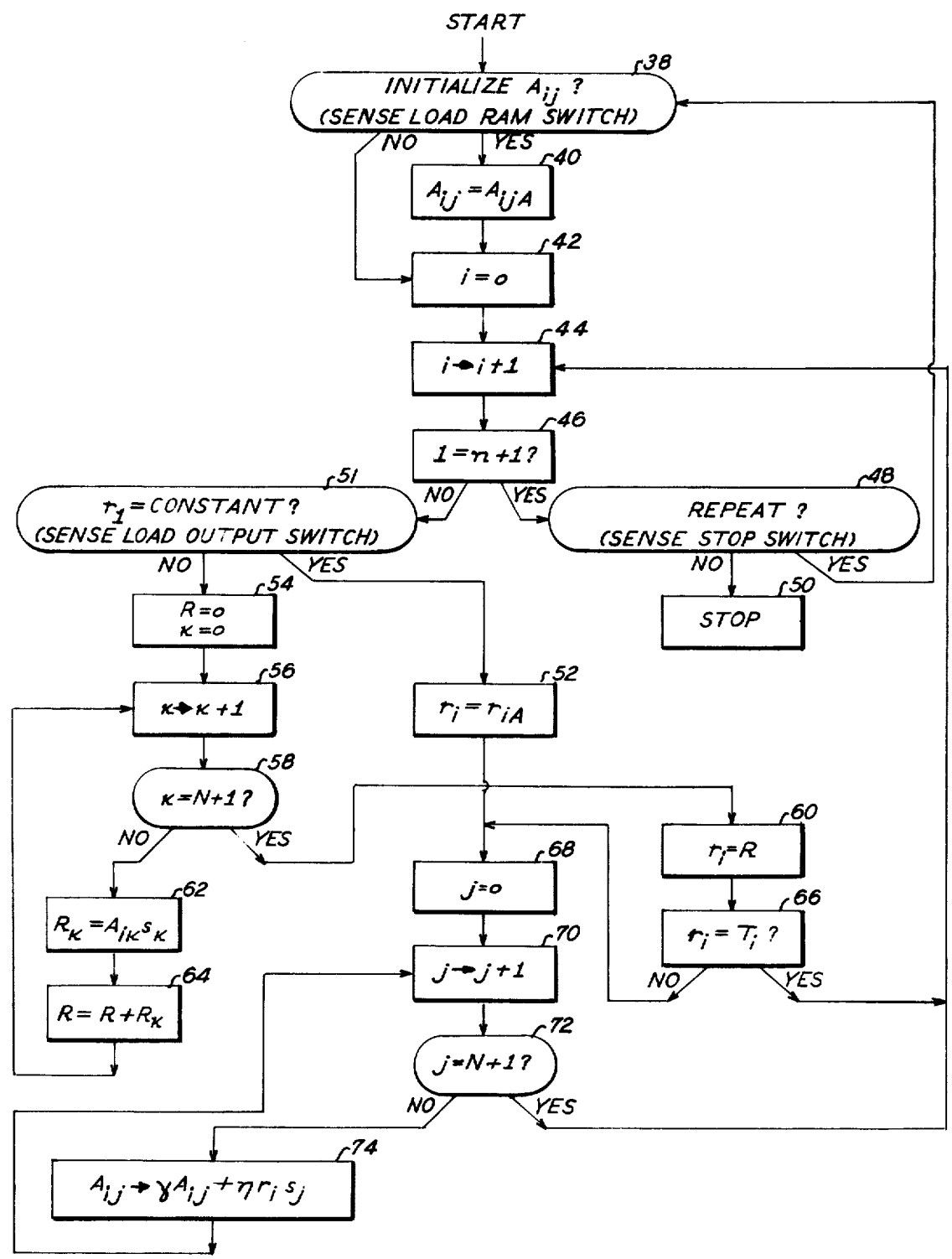
FIG. 3 is a flow chart detailing the operation of the digital information processing system of FIG. 2.

FIG. 3, illustrates, in flow chart form, a program which may be used to cause an information processing system of the type illustrated in FIG. 2 to carry out the algorithm to map the input signal $s_1, s_2, \ldots s_n$ into the output response $r_1, r_2, \ldots r_N$. When the program is started (e.g., by manually pressing the start button 30 on the timing and control unit 25) the load RAM switch 32 is sensed to determine whether the initial values of the weighting numbers $A_{ijA}$ are to be loaded into the RAM 23 (block 38). If so, each of the weighting numbers $A_{ij}$ in the RAM 23 is set equal to its initial value $A_{ijA}$ (block 40); if not, the program proceeds directly to initialize $i$ to zero (block 42). Thereafter, $i$ is increased by one (block 44) and a determination is made as to whether $i$ then exceeds the number ($n$) of output registers 22 (block 46). If it does, the computations of the numbers $r_1, r_2, \ldots r_n$ representing the output response are complete and the program may repeat itself or terminate depending upon the position of the stop switch 31 (block 48). If this switch is activated, the next instruction to be executed is a stop code (block 50); if not, control is returned to the part of the program which senses the load RAM switch (block 38).

If $i$ does not yet exceed $n$, the load output switch is sensed (block 51) to determine whether the numbers in the output registers 22 should be set equal to the values $r_{1A}, r_{2A} \ldots r_{nA}$ stored in the ROM 29. If so, these numbers are directly transferred (block 52); if not, each number representing an output response $r_i$ is calculated as follows:

Two variables R and k which are used in the calculation are first initialized by setting equal to zero (block 54). k is then incremented by one (block 56) and it is determined whether k then exceeds the number of input signals N (block 58). If so, the number $r_i$ representing the $i^{th}$ output response is set equal to R, which has been previously calculated, and this number is stored in the appropriate one of the output registers 22 (block 60). If k is less than or equal to N, the number stored in the $k^{th}$ input register 21 is multiplied by the weighting number $A_{ik}$ stored in the RAM 23 to give the product which is an intermediate variable $R_k$ (block 62). Thereafter, this intermediate variable $R_k$ is added to the stored value R to update the value R (block 64). As a result, when k finally exceeds N, R is the accumulated sum of $A_{ik}s_k$ for all k from 1 to N.

After each number representing an output response $r_i$ is calculated, it is compared with a constant threshold value $T_i$ (block 66) to determine whether the threshold has been reached. If so, the program is redirected to the point (block 44) where $i$ is incremented; if not, each of the weighting numbers $A_{ij}$ in the $i^{th}$ row is modified in the following manner:

The value of $j$ is first initialized by setting it equal to zero (block 68) and then incremented by adding one (block 70). Thereafter, it is determined whether the value of $j$ exceeds the total number of input signals N (block 72). If so, the modifications to $A_{ij}$ are completed and the value of $i$ is incremented by one (block 44). If not, the weighting number $A_{ij}$ stored in the RAM 23 is multiplied by the constant $\gamma$, the current numbers representing $r_i$ and $s_j$ are multiplied together, the product of these last two numbers is multiplied by the constant $\eta$ and the product thereof added to the product of $\gamma$ and $A_{ij}$. The sum produced by this addition is the new $A_{ij}$ which is then stored at the appropriate address in the RAM 23 (block 74). After this modification to the weighting number $A_{ij}$ is made, the value $j$ is again incremented by one (block 70) and the process is repeated.

The program described by the flow chart shown in FIG. 3 may be written using well known programming techniques in any language that is understandable by the particular information processing system employed. While it is believed that the generation of such a program from the flow chart of FIG. 3 would require no more than routine skill in the software art, an actual program written in conventional FORTRAN language is set forth in the appendix to this specification as an example. This program is designed to run on any commercially available general purpose computer which is capable of assembling FORTRAN or may be translated by a computer programmer familiar with FORTRAN into any other computer language using well known programming techniques. As an example, a first magnetic tape may comprise the input registers 21 and a second magnetic tape the output registers 22. High speed core memory may be used to store all the numbers located in the RAM 23 and the ROM's 26, 28 and 29. Latches may be used for the switches 31, 32 and 33.

From the discussion above, it will be appreciated that the centrally organized information processing system forming the first embodiment of the present invention employs conventional hardware which is programmed in a specific manner to execute the algorithm that is described in our U.S. Pat. No. 3,950,733 issued Apr. 13, 1976. This system makes efficient use of chip real estate and, because of the lack of redundant elements, may be low in cost.

Figure 6:
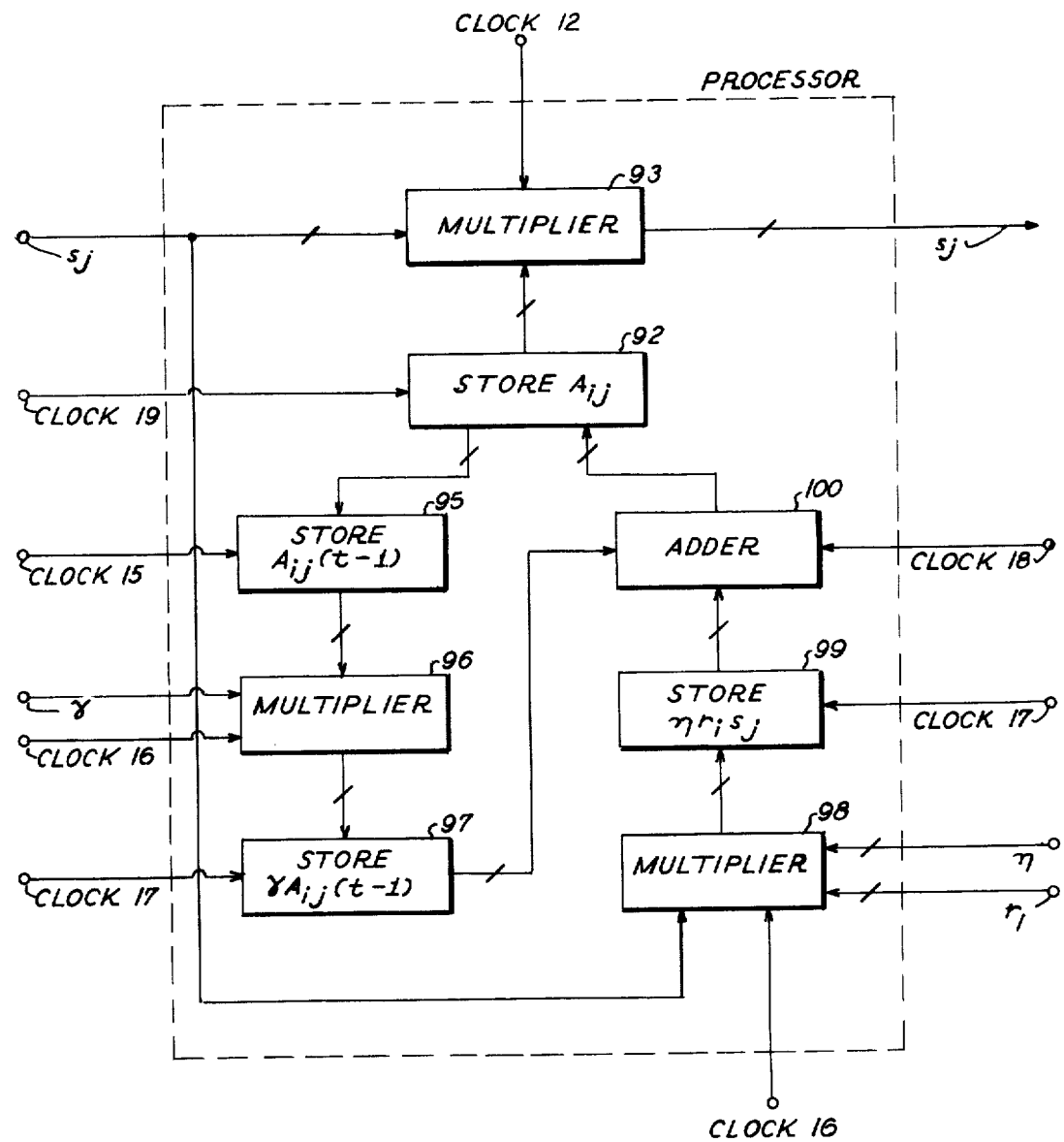
FIG. 6 is a block diagram illustrating a typical processor in the embodiment of FIG. 5.

FIGS. 5 and 6, which will now be described, illustrate a portion of a distributed information processing system in accordance with a second preferred embodiment of the present invention. Unlike the first embodiment described in connection with FIGS. 2 and 3, this second embodiment exhibits a high degree of structural redundancy, requiring a far greater number of circuit elements than the first embodiment for a given number N of input signals and a given number n of output responses. Notwithstanding this increased number of elements, however, this second embodiment of the present invention may actually cost less to produce in large-scale integrated circuit form than the first embodiment illustrated in FIGS. 2 and 3 and described above. In particular, while the first embodiment of the present invention requires that virtually every logic circuit element function properly for the information processing system to operate at all, the second embodiment takes advantage of the self-organizing nature of the Nestor$^{TM}$ adaptive module with the result that the system works well even when a portion of the physical structure is inoperative. This ability of the second embodiment to adapt to partially inoperative structure may be an important advantage in the manufacture of large-scale integrated circuits since the "yield" of circuits in which all of the circuit elements operate properly is something less than 100 percent.

Therefore, whereas the first embodiment of the adaptive information processing system is centrally organized and possesses a minimum number of redundant circuit elements, the second embodiment may be characterized as a spacially distributed system with a high degree of redundancy.

FIGS. 5 and 6 illustrate a nouveron network that closely corresponds to the nouveron network illustrated functionally in FIG. 4. It will be understood that this network of FIG. 4 constitutes a part of the Nestor$^{TM}$ adaptive module which is illustrated functionally in FIG. 1. Thus, an entire system constructed in accordance with the second preferred embodiment of the present invention will require n nouverons of the type illustrated in FIGS. 5 and 6.

The circuit if FIG. 5 comprises N input registers 76, 77, 78 and 79 adapted to receive numbers representing input signals $s_1, s_2, \ldots, s_j, \ldots, s_N$ from the input terminals 1, 2, ... j ... N, respectively. The numbers may be supplied to the input registers in either serial or parallel form. Parallel inputs are indicated in FIG. 5 by the convention "/". As is illustrated for the input register 78, each input register has gating input connected to a clock terminal 11. When a clock pulse is applied to this terminal 11, the input registers store the numbers supplied thereto from their respective input terminals.

Similarly, the device of FIG. 5 is provided with an output register 80 adapted to store a number representative of the output response $r_i$. This output register has a gating input which accepts a clock pulse from terminal 15 causing the contents of the register to change in accordance with the signals appearing at the register inputs.

Clock pulses are supplied in the circuit of FIG. 5 by an oscillator 81 and counter 82. The counter 82 has ten clock output terminals 11-20 which are successively and repeatedly activated.

The numbers stored in the input registers 76, 77, 78 and 79 are mapped into a number stored at the output register 80 by means of a plurality of processors 83, 84, 85 and 86, buffer registers 87, 88, 89 and 90 and an adder 91. As is shown in detail within the processor 85, each processor contains a register 92 for storing a weighting number $A_{ij}$, a multiplier 93 which receives inputs from the associated input register 78 and the storage register 92, and a device 94 for modifying the contents $A_{ij}$ of the storage register 92.

The multiplier 93 in the processors 83, 84, 85 and 86 are operative when gated by a clock pulse appearing at the clock terminal 12 to multiply the number in the associated input register representative of the input signal $s_j$ by the weighting number $A_{ij}$ stored in the register 92. The product of these two numbers is stored in the associated one of the buffer registers 87, 88, 89 and 90 upon receipt of a gating pulse appearing at the clock terminal 13. Thereafter, all of the numbers stored in the buffer registers 87, 88, 89 and 90 are added together by the adder 91 upon receipt of a gating pulse at the clock terminal 14. The sum of these numbers is presented to the output register 80 and stored therein when the register 80 receives a gating pulse from the clock terminal 15.

After the number in the output register 80 has been updated, the weighting number $A_{ij}$ in the storage register 92 of each processor 83, 84, 85 and 86 is modified in accordance with the equation (3) given above. This modification to $A_{ij}$ is accomplished by a device 94 that is shown in greater detail in FIG. 6.

The processor illustrated in FIG. 6 includes a storage register 95, multiplier 96, storage register 97, multiplier 98, storage register 99 and adder 100, in addition to the storage register 92 and multiplier 93 referred to above. Each of the elements 95-100 is connected to an appropriate clock terminal so that the calculation may be coordinated by the counter 82.

In operation, the weighting number $A_{ij}$ found in the storage register 92 is clocked into the register 95 and multiplied in the multiplier 96 by the constant $\gamma$. Thereafter, the product $\gamma A_{ij}(t-1)$ is read into the buffer register 97 by a gating pulse at the clock terminal 17.

The multiplier 98 is gated at the same time as the multiplier 96 to generate the product of the three numbers representative of the input signal $s_j$, the output response $r_i$ and the constant $\eta$, respectively. This product is gated into the buffer register 99 when the pulse appears at the clock terminal 17.

The constants $\gamma$ and $\eta$, which are supplied to the multipliers 96 and 98 in parallel form, may originate from separate registers or from sets of manually operable toggle switches.

Finally, the numbers stored in the buffer registers 97 and 99 are added together by the adder 100 when a gating pulse appears at the clock terminal 18. This sum is read into the storage register 92, completing the modification to the weighting number $A_{ij}$, when a pulse appears at the clock terminal 19.

It will be understood that the above-described embodiments are merely exemplary, and that persons skilled in the art may make many variations and modifications thereto without departing from the spirit and scope of the present invention. Accordingly, it is intended that all such modifications and variations be included within the scope of the invention as defined in the appended claims.

APPENDIX

Example of FORTRAN program for the flow chart of FIG. 3.

```
SET UP ARRAYS: A IS WEIGHT FACTOR ARRAY, R IS OUTPUT RESPONSE,
S IS INPUT ARRAY, T IS THRESHOLD ARRAY
DIMENSIONS A(100,100), R(100), S(100), T(100)
   (FOR EXAMPLE)
LOAD + STOP FLAGS
LOGICAL *1 LOAD, STOP, LDOUT (100)
READ IN LOAD SWITCH, NO. OF OUTPUT
   REGISTERS, NO. OF INPUT SIGNAL
READ (5,100) LOAD, NOUT, NIN, GAM, ETA
IS LOAD SWITCH SET? YES . . . READ IN
   WEIGHT FACTORS
(READ IN ALL INPUTS FOR EACH SUBSEQUENT RESPONSE)
IF(LOAD) READ (5,101) ((A(I,J), J = 1, NIN), I = 1, NOUT)
READ IN LOAD OUTPUT SWITCH VALUES & THRESHOLD VALUES
READ (5,102) (LDOUT (I), I = 1, NOUT)
READ (5,101) (T(I), I = 1, NOUT)
THE FOLLOWING DO LOOP COUNTS OUTPUT REGISTER
WHEN I EXCEEDS NO. OF O TPUT REGISTERS, EXIT IS
TAKEN FROM LOOP
DO 46 I = 1, NOUT
IF ITS OUPUT SWITCH IS SET, THEN READ IN
   CONSTANT FOR
ITH RESPONSE
IF (LDOUT(I)) GOTO 52
OUTPUT SWITCH NOT SET, THEN INITIALIZE
   ACCUMULATOR
AND READ IN INPUTS
RSUM = 0.
READ (5,101) (S(K), K = 1, NIN)
THIS DO LOOP HANDLES ACCUMULATOR
   SUMMING
DO 58 K = 1, NIN
RSUM = RSUM + A(I,K)*S(K)
CONTINUE
SET ITH RESPONSE EQUAL TO ACCUMULATOR AND TEST
THRESHOLD
R(I) = RSUM
IF (R(I).GE.T(I), GOTO 46
IF THRESHOLD NOT EXCEEDED, RECALCULATE A(I,J)
DO 72 J = 1, NIN
A(I,J) = GAM* A(I,J)+ETA* R(I)* S(J)
CONTINUE
GO TO 46
READ IN OUTPUT VALUE
READ (5,101) R(I)
DO 521 K = 1, NIN
521 S(K) = 0.
GO TO 70
CLOSE OUTPUT DO LOOP
CONTINUE
GET STOP SWITCH, SENSE..IF ON THEN OUTPUT RESPONSES AND STOP
READ (5,102) STOP
IF OFF, GO BACK TO BEGINNING
If (.NOT.STOP) GO TO 38
WRITE OUTPUT RESPONSES
WRITE (6,103) R(I), I = 1, NOUT)
STOP
FORMAT (L1, 2I3, 2F 10.5)
FORMAT (7F10.5)
FORMAT (72L1)
FORMAT ('OUTPUT RESPONSES: '/10(10F12.6))
END
```

We claim:

1. A digital, adaptive information processing system comprising, in combination:
   a. digital input register means for storing a plurality (N) of digital numbers $s_1, s_2 \ldots s_j \ldots s_N$, representing an input signal;
   b. digital output register means for storing a plurality (n) of digital numbers $r_1, r_2 \ldots r_i \ldots r_n$, representing an output response; and
   c. digital information processing apparatus connecting said input register means with said output register means, said apparatus comprising:
      1. digital memory means for storing a plurality (n × N) of digital weighting numbers $A_{11}, A_{12} \ldots A_{ij} \ldots A_{nN}$;
      2. digital multiplier means, coupled to said input register means and to said memory means, for multiplying selected ones $s_j$ of said numbers located in said input register means with selected ones $A_{ij}$ of said weighting numbers to produce digital product numbers $s'_j$ in accordance with the formula:

$$s'_j = A_{ij} s_j$$

3. digital adder means, coupled to said multiplier means and to said output register means, for adding together selected ones of said product numbers $s'_j$ produced by said multiplier means to produce digital sum numbers $r_i$ in accordance with the formula:

$$r_i = \sum_{j=1}^{N} s'_j$$

said sum numbers $r_i$ being stored in said output register means; and
      4. digital modifier means, coupled to said input register means, said output register means and to said memory means, for changing at least one of said weighting numbers $A_{ij}$ in accordance with the formula:

$$A_{ij}(t) = \gamma A_{ij}(t-1) + \eta s_j r_i$$

where $A_{ij}(t)$ is the new number stored in said memory means, $A_{ij}(t-1)$ is the number previously stored in said memory means, $\gamma$ is a decay constant in the range $o \leq \gamma \leq 1$, $\eta$ is a learning constant for which $o \leq \eta$, $s_j$ is the number stored in said input register means, $r_i$ is the member stored in said output register means, and $i$ and $j$ are integers from 1 to $n$ and N, respectively.

2. The information processing system defined in claim 1, wherein said adder means includes a means for producing all ($n$) of said numbers $r_1, r_2, \ldots r_n$ in accordance with said formula for $r_i$.

3. The information processing system defined in claim 1, wherein said modifier means includes means for changing all ($n \times N$) of said weighting numbers $A_{11}, A_{12}, \ldots A_{21}, A_{22}, \ldots A_{nN}$ in accordance with said formula for $A_{ij}(t)$.

4. The information processing system defined in claim 1, wherein said digital modifier means includes means for varying the modification of said weighting numbers $A_{ij}$.

5. The information processing system defined in claim 4, wherein said modification varying means includes means for varying the decay constant $\gamma$ and the learning constant $\eta$.

6. The information processing system defined in claim 4, wherein said modification varying means includes means for reducing the modification of said weighting numbers $A_{ij}$ to zero, whereby said information processing system operates as distributed memory.

7. The information processing system defined in claim 1, wherein said memory means forms a separate unit located spacially apart from said multiplier means, said adder means and said modifier means, whereby said information processing apparatus is centrally organized.

8. The information processing system defined in claim 7, wherein said multiplier means, said adder means, and said modifier means comprise the arithmetic unit of a programmable microprocessor.

9. The information processing system defined in claim 8, wherein said arithmetic unit is formed on a single large-scale integrated circuit.

10. The information processing system defined in claim 1, wherein individual storage elements of said memory means are located spacially throughout said information processing apparatus together with said multiplier means, said adder means and said modifier means, whereby said information processing apparatus is spacially distributed.

11. The information processing system defined in claim 10, wherein said memory means comprises a plurality of individual storage elements, said multiplier means comprises a plurality of individual multiplier elements, said adder means comprises a plurality of individual adder elements and said modifier means comprises a plurality of individual modifier elements; and wherein said storage, multiplier, adder and modifier elements are distributed spacially throughout said information processing apparatus.

12. The information processing system defined in claim 11, wherein said storage, multiplier, adder and modifier elements are arranged functionally and located spacially to form mnemonders and nouverons on a large-scale integrated circuit.

13. A method of processing information, comprising the steps of:

a. storing a plurality (N) of digital input numbers $s_1, s_2, \ldots, s_j, \ldots s_N$ representing an input signal;

b. storing a plurality ($n \times N$) of digital weighting numbers $A_{11}, A_{12}, \ldots A_{ij}, \ldots, A_{nN}$;

c. multiplying selected ones $s_j$ of said input numbers with selected ones $A_{ij}$ of said weighting numbers to produce digital product numbers $s'_j$ in accordance with the formula:

$$s'_j = A_{ij} s_j.$$

d. adding together selected ones of said product numbers $s'_j$ to produce a plurality ($n$) of digital output numbers $r_1, r_2, \ldots r_i, \ldots r_n$ in accordance with the formula:

$$r_i = \sum_{j=1}^{N} s'_j.$$

e. storing said digital output numbers $r_i$ representing an output response; and f. modifying at least one of said weighting numbers $A_{ij}$ in accordance with the formula:

$$A_{ij}(t) = \gamma A_{ij}(t-1) + \eta s'_j.$$

where $A_{ij}(t)$ is the new weighting number, $A_{ij}(t-1)$ is the previous weighting number, $\gamma$ is a decay constant in the range $o\gamma 1$, $\eta$ is a learning constant for which $o \leq \eta$, $s_j$ is the input number, $r_i$ is the output number, and $i$ and $j$ are integers from 1 to $n$ and N, respectively.

14. The method of processing information defined in claim 13, wherein said modifying step includes the step of modifying all ($n \times N$) of said weighting numbers $A_{11}, A_{12}, \ldots A_{21}, A_{22}, \ldots A_{nN}$ in accordance with said formula for $A_{ij}(t)$.

15. The method of processing information defined in claim 13, wherein said modifying step includes the step of varying the modification of said weighting numbers $A_{ij}$.

16. The method of processing information defined in claim 15, wherein said modification varying step includes the step of varying the decay constant $\gamma$.

17. The method of processing information defined in claim 15, wherein said modification varying step includes the step of varying the learning constant $\eta$.

18. The method of processing information defined in claim 15, wherein said modification varying step includes the step of reducing the modification of said weighting numbers $A_{ij}$ to zero.

* * * * *